Patented Mar. 21, 1933

1,902,084

UNITED STATES PATENT OFFICE

GEORG KRAENZLEIN AND ERNST DIEFENBACH, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

ACID DYESTUFFS OF THE ANTHRAQUINONE SERIES

No Drawing. Application filed March 6, 1931, Serial No. 520,706, and in Germany April 4, 1930.

The present invention relates to new acid dyestuffs.

We have found that the compounds of the following general formula:

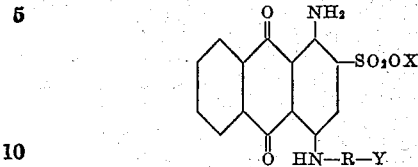

wherein X stands for hydrogen or an alkali metal atom, R for an aromatic radical, which may contain substituents or other radicals and Y for an esterified carboxylic acid group, are valuable acid dyestuffs forming crystalline water-soluble powders dyeing wool clear tints of good to very good fastness to fulling and to sea water.

The dyestuffs may be prepared in various ways: 1 - amino-4-halogen-anthraquinone-2-sulfonic acid is, for instance, condensed with a compound of the following general formula:

$NH_2.R.COOH$ wherein R has the above meaning, and the carboxylic acid group is esterified according to known methods; or 1-amino-4-halogen-anthraquinone-2-sulfonic acid is condensed with a compound of the following general formula:

$NH_2.R.Y$ wherein Y stands for an esterified carboxylic acid group and R has the above meaning.

A further method of preparing the new acid dyestuffs consists in condensing the 1-amino-2.4-dihalogen-anthraquinone with a compound of the formula:

$NH_2—R—Y$ wherein R has the above meaning and Y stands for an esterified carboxylic acid group, and in exchanging the halogen atom in the 1 - amino-2-halogen-4-arylido-anthraquinone thus obtained for a sulfonic acid group, advantageously by treatment with an alkali metal sulfite.

The same dyestuffs may also be obtained by causing the 1-amino-2.4-dihalogen-anthraquinone to react with a compound of the following formula:

$NH_2.R.COOH$ wherein R has the above meaning, and by subsequently esterifying the COOH group, before or after the exchange of the halogen for the sulfonic acid group.

The following examples serve to illustrate the invention, but they are not intended to limit it thereto, the parts being by weight:

(1) 15 parts of the blue dyestuff, obtainable by condensing 1-amino-4-bromo-anthraquinone - 2 - sodium sulfonate with meta-amino - benzoic acid according to known methods, are dissolved in 750 parts of ethyl alcohol. The solution is saturated with dry hydrogen chloride and boiled gently for 24 hours on the reflux apparatus. On cooling, the hydrochloride of the ethyl ester of the dyestuff separates from the solution in the form of fine scarlet-red needles, which, after being filtered by suction, are washed with a small quantity of cold alcohol and dried in a vacuum. The dyestuff easily dissolves in water and dyes wool clear blue tints. As compared with the non-esterified dyestuff it has a purer tint and a better fastness to fulling and to sea water.

(2) 10 parts of the dyestuff obtainable by heating 1 - amino-4-bromo-anthraquinone-2-sulfonic acid with 3'-amino-benzophenone-4'-2-dicarboxylic acid in the presence of water, sodium carbonate and a small quantity of cuprous chloride are esterified in 500 parts of ethyl alcoholic hydrochloric acid. After evaporation of the alcohol, the residue is treated with a cold dilute solution of sodium carbonate, filtered with suction and washed until neutral. The dyestuff dyes wool clear blue tints of excellent fastness to fulling and sea water.

(3) The dyestuff in the presence of water, sodium carbonate and a small quantity of cuprous chloride—obtainable by heating 4'-amino-diphenylmethane-2-carboxylic acid with 1-amino-4-bromo-anthraquinone-2-sulfonic acid in the presence of water, sodium carbonate and a small quantity of a copper compound—is transformed into its ethyl ester by treatment with ethyl alcoholic hydrochloric acid while heating. It dyes wool a clear greenish blue tint of good fastness properties to fulling and to sea water.

(4) 15 parts of the dyestuff obtainable by heating meta-amino-para-toluyl-ortho-benzoic acid with 1-amino-4-bromo-anthraquinone-2-sulfonic acid in the presence of water, sodium carbonate and a small quantity of cuprous chloride and corresponding with the following formula:

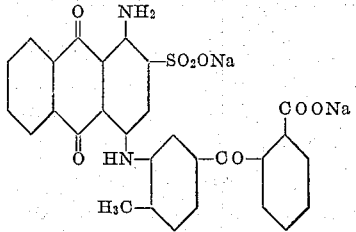

are dissolved in 600 parts of methyl alcohol, the solution is saturated by means of dry hydrochloric acid and heated in a reflux apparatus; the dyestuff is thus transformed into its methyl ester. There is obtained a product which dyes wool clear blue tints of very good fastness to washing, to fulling and to sea water.

(5) The dyestuff obtainable by condensing 1-amino-4-bromo-anthraquinone-2-sulfonic acid and para-amino-cinnamic acid is transformed into its methyl ester in the manner described above. The product thus obtained dyes wool very greenish blue tints of a better fastness to fulling than those produced by the non-esterified dyestuff.

(6) 4-aminodiphenylamine-2-carboxylic acid yields on condensation with 1-amino-4-bromo-anthraquinone-2-sulfonic acid a green dyestuff. It is transformed into its ester by treating it with ethyl alcohol and hydrochloric acid; it dyes wool clear green tints of good fastness to fulling and to sea water.

(7) The blue dyestuff obtainable by condensing 1-amino-4-bromoanthraquinone-2-sodium sulfonate with 3'-amino-4'-methyldiphenylmethane-2-carboxylic acid is transformed into its ethyl ester by treatment with hydrochloric acid or sulfuric acid in ethyl alcohol according to known methods. The product dyes wool and silk very clear, pure blue tints of excellent fastness to fulling and sea water.

(8) By condensing 1-amino-4-bromo-anthraquinone-2-sodium sulfonate with 3-amino-5-methyl-6-hydroxybenzoic acid there is obtained a wool dyestuff yielding greenish blue tints; by transforming it into its ethyl ester, the clearness of the tints and the fastness to fulling is improved.

(9) By causing amino-terephthalic acid to react with 1-amino-4-bromo-anthraquinone-2-sodium sulfonate in the usual manner, there is obtained a product dyeing blue tints. By esterifying its carboxylic acid groups by means of ethyl alcohol and hydrochloric acid it yields tints of a more greenish blue and a better fastness to fulling than the product obtained from the non-esterified dyestuff.

(10) 40 parts of 1-amino-4-bromo-anthraquinone-2-sodium sulfonate, 16 parts of sodium carbonate, 30 parts of orthoaminobenzoic acid ethyl ester and 2 parts of cuprous chloride are warmed in 600 parts of water for 20 hours, while stirring. In order to separate the dyestuff, sodium chloride is added to the reaction mixture. After cooling, the precipitate is filtered with suction and washed with a solution of sodium chloride of 10% strength. The product is further purified by dissolving it in dilute sodium carbonate solution, the solution is filtered and the dyestuff is precipitated by acidifying with hydrochloric acid or by salting out.

(11) 15 parts of 1-amino-4-bromoanthraquinone-2-sodium sulfonate, 8 parts of sodium bicarbonate and 0.5 part of cuprous chloride are mixed with 400 parts of water and the whole is heated to 90° C. To this mixture there is added a warm solution of 15 parts of ortho-aminobenzyl-ortho-benzoic acid ethyl ester (obtainable by treating with hydrochloric acid and ethyl alcohol the 2'-amino-diphenylmethane-2-carboxylic acid) in 50 parts of pyridine, and the whole is heated to 90° C.-95° C. for 40 hours, while stirring. The pyridine is removed by steam-distillation from the reaction liquid, and the dyestuff thus formed is isolated in the usual manner.

(12) 80 parts of 1-amino-4-bromoanthraquinone-2-sodium sulfonate, 40 parts of sodium bicarbonate and 3 parts of cuprous chloride are introduced into 900 parts of water, and a solution of 50 parts of meta-aminobenzoic acid ethyl ester in 100 parts of ethyl alcohol is added thereto. The mixture is gently boiled for 10 hours, while stirring, the alcohol is removed by steam-distillation and the dyestuff thus formed is isolated by salting it out by means of a potassium chloride solution of 30% strength.

(13) 76 parts of 1-amino-2.4-dibromoanthraquinone, 42 parts of meta-aminobenzoic acid, 40 parts of anhydrous potassium acetate, 1 part of copper acetate and 1 part of pulverized copper and 800 parts of amyl alcohol are heated to boiling for 15 hours under reflux. After cooling, the solution is filtered with suction, the solid matter is washed with alcohol and water and dried. In order to transform the product into its sulfonic acid, 10 parts of the crude product, 40 parts of phenol, 8 parts of potassium sulfite and 20 parts of water are gently boiled for 16 hours. After the condensation product has become entirely dissolved in the water, the phenol is blown off by steam and the dyestuff is precipitated from the filtered solution by acidification. The product is transformed into its carboxylic acid ethyl ester in the manner described in Example 1.

(14) 57 parts of 1-amino-2.4-dibromo-anthraquinone, 37 parts of meta-aminobenzoic acid ethyl ester, 30 parts of anhydrous potassium acetate, 0.75 part of copper acetate, 0.75 part of pulverized copper and 375 parts of amyl alcohol are stirred in the oil bath for 13 hours at 150° C.-160° C. After cooling, the solution is filtered with suction and the solid matter is washed with alcohol and water and dried. The product is transformed into the sulfonic acid in a manner analogous to that described in the preceding example. The dyestuff thus obtained is identical with the product obtained in Example 13 by subsequent esterification as well as with the dyestuff described in Examples 1 and 12.

(15) 38 parts of 1-amino-2.4-dibromo-anthraquinone, 31 parts of amino-terephthalic acid dimethyl ester, 20 parts of anhydrous potassium acetate, 0.5 part of copper acetate and 0.5 part of pulverized copper are stirred with 200 parts of amyl alcohol in the oil bath for 12 hours at 150° C.-160° C. After cooling, the solution is filtered and the condensation product which has been precipitated, is washed with alcohol and water and dried. In order to replace the bromo atom in the 2-position by the sulfonic acid group, 20 parts of the crude product, 45 parts of a potassium sulfite solution of 35% strength and 40 parts of phenol are heated to gentle boiling until a test portion after being freed from phenol dissolves in water to a clear solution. After the phenol has been driven off by means of steam, the solution is filtered and the product is worked up in the usual manner, the dyestuff thus obtained dyes wool blue tints.

We claim:

1. As new products, the compounds of the following general formula:

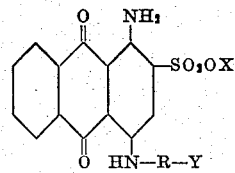

wherein X stands for hydrogen or an alkali metal atom, R for an aromatic radical and Y for an esterified carboxylic acid group, forming crystalline water-soluble powders and dyeing wool clear tints of good to very good fastness to fulling and to sea water.

2. As a new product, the compound of the following formula:

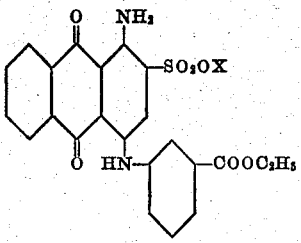

wherein X stands for hydrogen or an alkali metal atom which product easily dissolves in water and dyes wool very clear blue tints of a pure shade and a good fastness to fulling.

3. As a new product, the compound of the following formula:

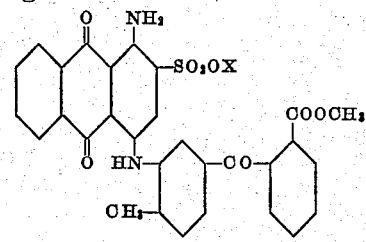

wherein X stands for hydrogen or an alkali metal atom dyeing wool blue tints of very good fastness to fulling and to sea water.

4. As a new product, the compound of the following formula:

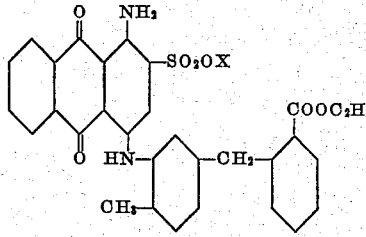

wherein X stands for hydrogen or an alkali metal atom dyeing wool and silk very clear pure blue tints of excellent fastness to fulling and to sea water.

5. As new products, the compounds of the general formula:

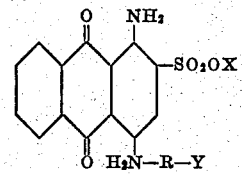

wherein X stands for hydrogen or an alkali metal atom, R for a radical of the benzene series and Y for an esterified carboxylic acid group or for a radical of the benezene series containing an esterified carboxylic acid group, forming crystalline water-soluble powders and dyeing wool clear tints of good to very good fastness to fulling and to sea water.

In testimony whereof, we affix our signatures.

GEORG KRAENZLEIN.
ERNST DIEFENBACH.